(12) United States Patent
Kibe

(10) Patent No.: US 6,834,059 B2
(45) Date of Patent: Dec. 21, 2004

(54) SDH SIGNAL CHANNEL POINTER ANALYZING APPARATUS AND METHOD

(75) Inventor: Koichi Kibe, Atsugi (JP)

(73) Assignee: Anritsu Corporation, Tokyo (JP)

( * ) Notice: Subject to any disclaimer, the term of this patent is extended or adjusted under 35 U.S.C. 154(b) by 758 days.

(21) Appl. No.: 09/764,578

(22) Filed: Jan. 18, 2001

(65) Prior Publication Data

US 2001/0008536 A1 Jul. 19, 2001

(30) Foreign Application Priority Data

Jan. 19, 2000 (JP) .................................. 2000-011046

(51) Int. Cl.[7] .............................................. H04J 3/02
(52) U.S. Cl. ................................... 370/517; 370/907
(58) Field of Search .............................. 370/506, 509, 370/516, 517, 907, 503

(56) References Cited

U.S. PATENT DOCUMENTS 5,428,612 A * 6/1995 Scheffel et al. ............. 370/468
5,550,876 A * 8/1996 Urbansky .................... 375/371
5,751,720 A * 5/1998 Uematsu et al. ............ 370/503
6,118,795 A * 9/2000 Fukunaga et al. .......... 370/503
6,157,658 A * 12/2000 Toyoyama et al. ......... 370/505

* cited by examiner

*Primary Examiner*—Chau Nguyen
*Assistant Examiner*—Richard Chang
(74) *Attorney, Agent, or Firm*—Frishauf, Holtz, Goodman & Chick, P.C.

(57) ABSTRACT

A channel pointer extractor extracts channel pointer value inserted in a SDH signal based on the pointer position information contained in the channel information, each time the channel information is detected by a channel information detector. A reference data readout section readouts the reference data of the channel specified by the channel identification information contained in the channel information from a reference data memory, each time the channel information is detected by the channel information detector. A pointer processing section judges the states of justification and alarm, from the channel pointer value extracted from the channel pointer extractor, and reference data read out by the reference data readout section and generates a new reference data based on the judgment results.

4 Claims, 4 Drawing Sheets

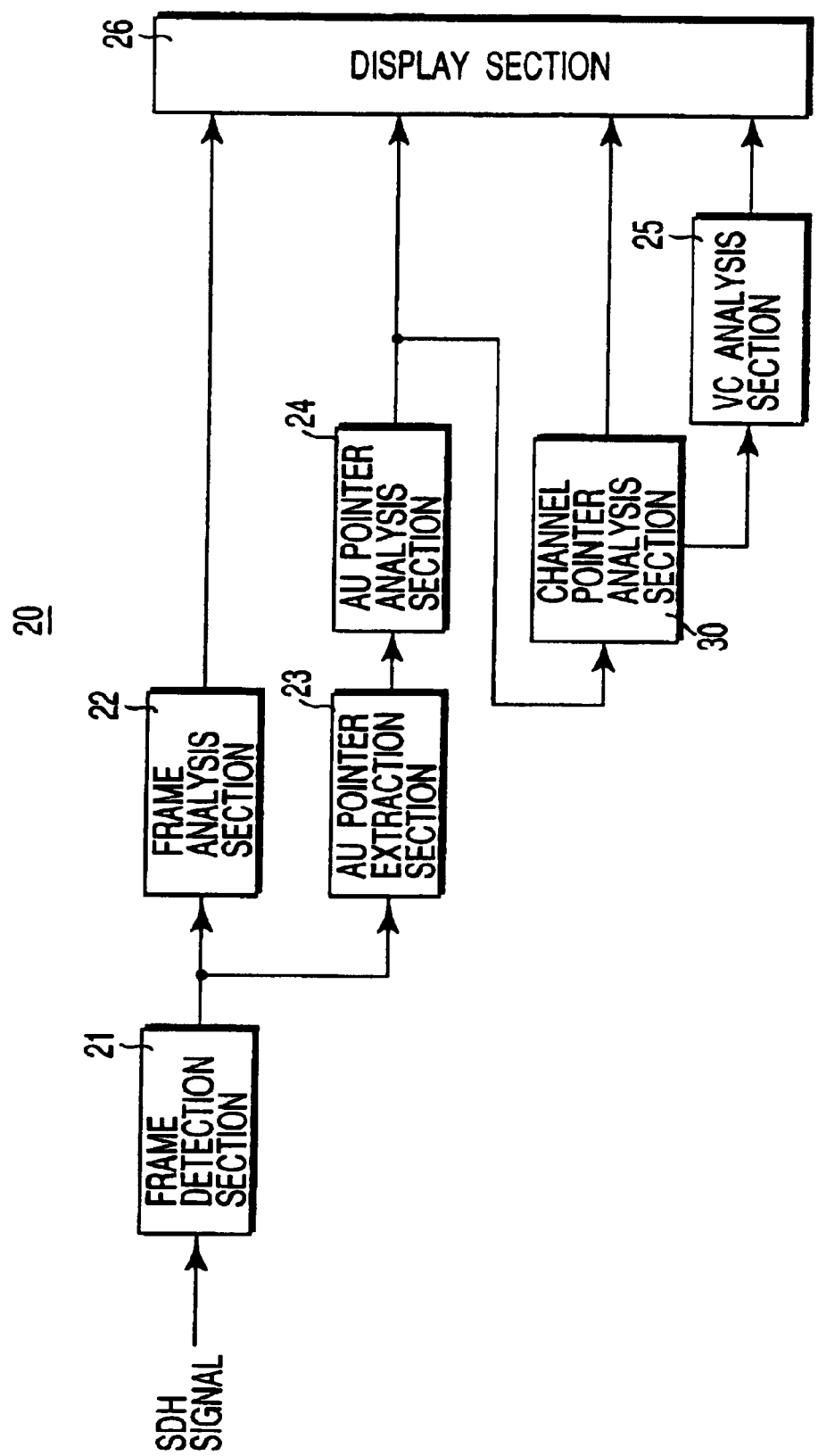
F I G. 1

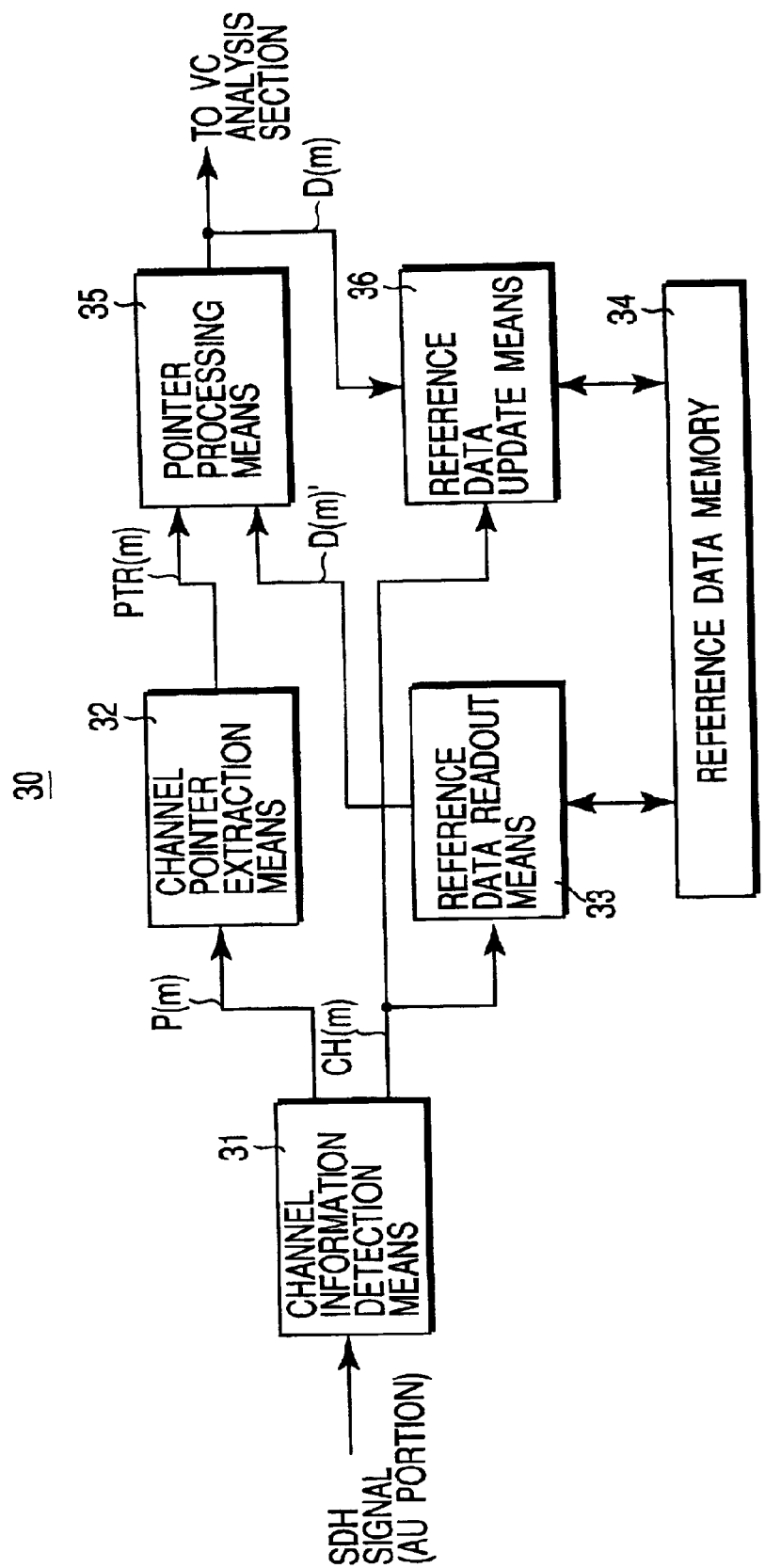
F I G. 2

SDH SIGNAL CHANNEL POINTER ANALYZING APPARATUS AND METHOD

CROSS-REFERENCE TO RELATED APPLICATIONS

This application is based upon and claims the benefit of priority from the prior Japanese Patent Application No. 2000-011046 filed Jan. 19, 2000, the entire contents of which are incorporated herein by reference.

BACKGROUND OF THE INVENTION

The present invention relates to a SDH signal channel pointer analyzing apparatus and a method thereof, and particularly a SDH signal channel pointer analyzing apparatus and a method thereof adopting a technology for simplifying a configuration of apparatus for carrying analysis of SDH signal channel pointer.

Conventionally, in the data transfer system of synchronized transfer mode STM-N (N is any one integer of 1, 4, 16, or 64), SDH signal whose one frame is composed of SOH (section overhead) portion of 9×9×N bytes and payload portion of 9×261×N bytes is transferred as shown in FIG. 4.

An AU pointer indicating the leading head position of information inserted into the payload portion is inserted, to SOH portion of this SDH signal.

A channel pointer indicating the information leading head position or the like of a plurality of (for instance, 84) channels multiplexed and inserted in the payload portion, at the leading head position A of the payload portion indicated by this AU pointer.

In the transfer system using such SDH signal, the difference of insertion position due to phase shifting between information to be multiplexed and frame to be inserted is absorbed by adjusting the channel pointer value, when information of respective channel is to be multiplexed and inserted into the frame.

Here, this adjustment of channel pointer value is called justification.

Besides, this channel pointer value is limited in a predetermined range, and if successive pointers exceed this predetermined range, data can not be transferred correctly.

Also, it is necessary to inform of a pointer value, out of the predetermined range, or of abnormal state, by an alarm, if they succeed the predetermined number of times.

Therefore, is such SDH signal is to be processed, it is necessary to analyze the respective pointer channel increase/decrease state, the range of pointer value, or others.

Consequently, in the conventional apparatus for processing SDH signal, the channel pointer is analyzed by a channel pointer analyzing apparatus 10 as shown in FIG. 5.

First, this channel pointer analyzing apparatus 10 designate the channel to by analyzed by a channel designation means 11.

Next, the pointer of the designated channel is detected by a pointer detection means 12.

Then, increase/decrease decision of the detected pointer or range decision processing are performed by pointer processing means 13.

However, the conventional channel pointer analyzing apparatus 10 can not perform but the pointer analysis of a single channel designated by the channel designation means 11, and the pointer state of a plurality of channels inserted in the same frame of the input SDH could not be acquired at the same time.

In order to solve this problem, it can be devised to install several sets of the channel pointer analyzing apparatus 10 corresponding respectively to a plurality of channels to be analyzed.

However, this provokes another problem of increasing a configuration scale and the cost of the apparatus.

BRIEF SUMMARY OF THE INVENTION

The object of the present invention is to provide a SDH signal channel pointer analyzing apparatus and method that can solve the problems mentioned above, and perform the pointer analysis of a plurality of channels inserted into the frame of SDH signal by a simple configuration at the same time.

In order to achieve the aforementioned object, according to an aspect of the present invention, there is provided a SDH signal channel pointer analyzing apparatus, comprising:

channel information detection means for sequentially detecting pointer position information of channels inserted in a frame of an input SDH signal, and channel identification information for identifying the channel, as a set of channel information;

channel pointer extraction means for extracting channel pointer value inserted in the input SDH signal based on the pointer position information contained in the channel information, each time the channel information is detected by the channel information detection means;

a reference data memory for storing channel pointer value, pointer counter data and status data representing alarm states as a set of reference data for each channel, respectively in different address area for each channel;

reference data readout means for reading out the reference data of the channel specified by channel identification information contained in the channel information from the reference data memory, each time the channel information is detected by the channel information detection means;

pointer processing means for judging states of justification and alarm, from the channel pointer value extracted from the channel pointer extraction means, and reference data read out by the reference data readout means and for generating a new reference data based on the judgment results; and reference data update means for updating the reference data of the same channel stored in the reference data memory by the new reference data generated by the pointer processing means.

In order to achieve the aforementioned object, according to another aspect of the present invention, there is provided a SDH signal channel pointer analyzing method, comprising the steps of:

sequentially detecting pointer position information of channels inserted in a frame of an input SDH signal, and channel identification information for identifying the channel, as a set of channel information;

extracting channel pointer value inserted in the input SDH signal based on the pointer position information contained in the channel information, each time the channel information is detected;

storing channel pointer value, pointer counter data and status data representing alarm states as a set of reference data for each channel into a reference data memory, respectively in different address area for each channel;

reading out the reference data of the channel specified by channel identification information contained in the channel information from the reference data memory, each time the channel information is detected;

judging states of justification and alarm, from the extracted channel pointer value, and reference data read out from the reference data memory and, generating a new reference data based on the judgment results; and updating the reference data of the same channel stored in the reference data memory by the new reference data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a configuration of a SDH signal analyzing apparatus to which the SDH signal channel pointer analyzing apparatus according to one embodiment of the present invention is applied;

FIG. 2 is a block diagram showing a configuration of a channel pointer analysis section of FIG. 1;

DETAILED DESCRIPTION OF THE INVENTION

Figure 3A:
FIGS. 3A to 3E are timing diagrams illustrating the operation of the embodiment of FIG. 1.

Reference will now be made in detail to the presently preferred embodiments of the invention as illustrated in the accompanying drawings, in which like reference numerals designate like or corresponding parts.

Now, the embodiment of the present invention shall be described based on drawings.

FIG. 1 is a block diagram showing a configuration of a SDH signal analyzing apparatus to which the SDH signal channel pointer analyzing apparatus according to one embodiment of the present invention is applied.

In other words, FIG. 1 shows a configuration of a SDH signal analyzing apparatus 20 having the SDH signal channel pointer analyzing apparatus according to this embodiment as channel pointer analysis section.

This SDH signal analyzing apparatus 20 comprises a frame detection section 21 for detecting the frame of input SDH signal, a frame analysis section 22 for performing error check of the whole frame detected by this frame detection section 21 or others, an AU pointer extraction section 23 for extracting AU pointer from SOH portion of the frame detected by the frame detection section 21, an AU pointer analysis section 24 for performing analysis processing of the AU pointer extracted by this AU pointer extraction section 23, a channel pointer analysis section 30 for performing analysis processing of the channel pointer, for SDH signal of the payload portion whose leading head position is indicated by the AU pointer extracted by the AU pointer extraction section 23, a VC analysis section 25 for performing analysis processing of respective information whose leading head position is indicated by respective channel pointer analyzed by this channel pointer analysis section 30, and a display section 26 for displaying the analysis results of respective analysis sections 30, 25, and the analysis results of each portions of input SDH signal can be confirmed by the display section 26.

FIG. 2 is a block diagram showing a configuration of a channel pointer analysis section 30 used for the SDH signal analyzing apparatus 20 shown in FIG. 1.

In addition, it is supposed that pointer analysis of, for instance, K=M/3 channel (28 channels) are performed in parallel, given the time necessary for processing, for the number of all channels M (for instance, M=84) contained in one frame of SDH signal, in this channel pointer analysis section 30.

The channel information detection means 31 of this channel pointer analysis section 30 detects pointer position information P(1) to P (K) of channels inserted in the frame of input SDH signal, from information inserted into the leading head position of the payload portion shown by the AU pointer extracted from the AU pointer extraction section 23 of FIG. 1.

Then this channel information detection means 31 outputs sequentially a set [CH (m), P (m)] of channel information, combining detected respective pointer position information and identification information CH (1) to CH (K) specifying the channel thereof (m is a number from 1 to K).

Also, the channel pointer extraction means 32 extracts he channel pointer value PTR (m) inserted into SDH signal based on the pointer position information P (m), each time it receives the pointer position information P (m) detected by the channel information detection means 31.

On the other hand, the reference data readout means 33 designates an address AD (m) corresponding to the pointer position information P (m) to the reference data memory 34, each time it receives the pointer position information P (m) detected by the channel information detection means 31, and reads out the reference data stored in that address AD (m).

In this reference data memory 34, channel pointer value P (m)' detected in the previous frame, pointer counter data J (m)' whose value increases/decreases according to the justification up to the previous frame, and alarm state data AL (m)' indicating the alarm detection state and the detection cancellation state up to the previous frame are combined as a set of reference data D (m)', and this reference data D (m)' is stored in the address AD (m) corresponding to respective channel.

In the following description, data showing the alarm detection state and data showing the alarm cancellation state are both noted as AL (m).

The pointer processing means 35 judges the justification state and the alarm state from channel pointer value PTR (m) extracted by the channel pointer extraction means 32 and reference data D (m)' read out by the reference data readout means 33 and generates a new pointer counter data J (m) and alarm state data AL (m) based on the judgment results thereof.

The reference data updating means 36 updates the reference data D (m)' stored in the address AD (m) of the reference data memory 34, by a new reference data D (m)

made of channel pointer value PTR (m) extracted by the channel pointer extraction means 32, a new pointer counter data J (m) generated by the channel pointer processing means 35 and alarm state data AL (m).

Next, the operation of the SDH signal analyzing apparatus 20 shall be described based on FIG. 1 and FIG. 2.

When SDH signal is input, a frame detection section 21 detects the frame, and error alarm check or others of this detected frame is performed by a frame analysis section 22.

Then the AU pointer extraction section 23 extracts the AU pointer from the SOH portion of this extracted frame and an AU pointer analysis section 24 performs the analysis processing of the extracted AU pointer.

In addition, the channel pointer analysis section 30 performs the analysis processing of the channel pointer, for SDH signal of the payload portion whose leading head position is indicated by this AU pointer.

Figure 3B:

In other words, the pointer position information P (1) of the channel 1 inserted into the payload portion of the frame of input SDH signal is output, as shown in FIGS. 3A and 3B, by the channel information detection means 31 with channel identification information CH (1) identifying this channel 1.

Figure 3C:

Thereupon, as shown in FIG. 3C, the channel pointer extraction means 32 extracts the channel pointer PTR (1) from the pointer position information P (1) of this channel 1 and outputs to the pointer processing means 35.

Figure 3D:
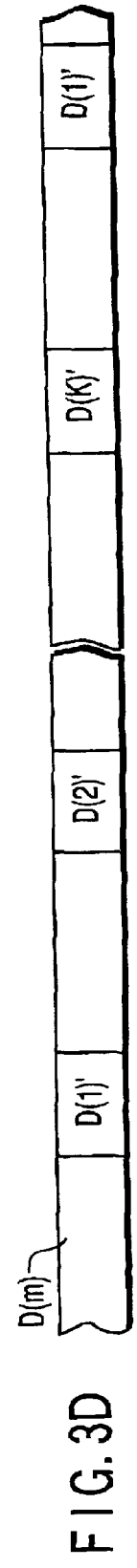
Figure 3E:
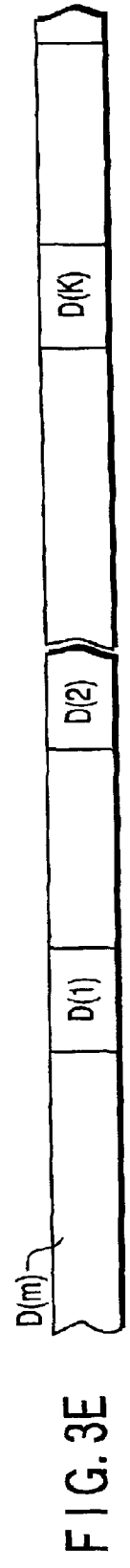
Figure 4:
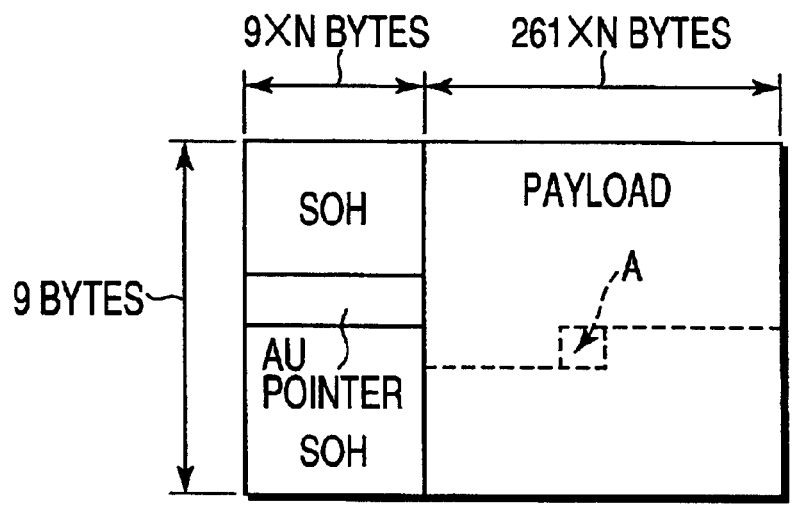
FIG. 4 shows a frame of SDH signal for illustrating the prior art.
Figure 5:
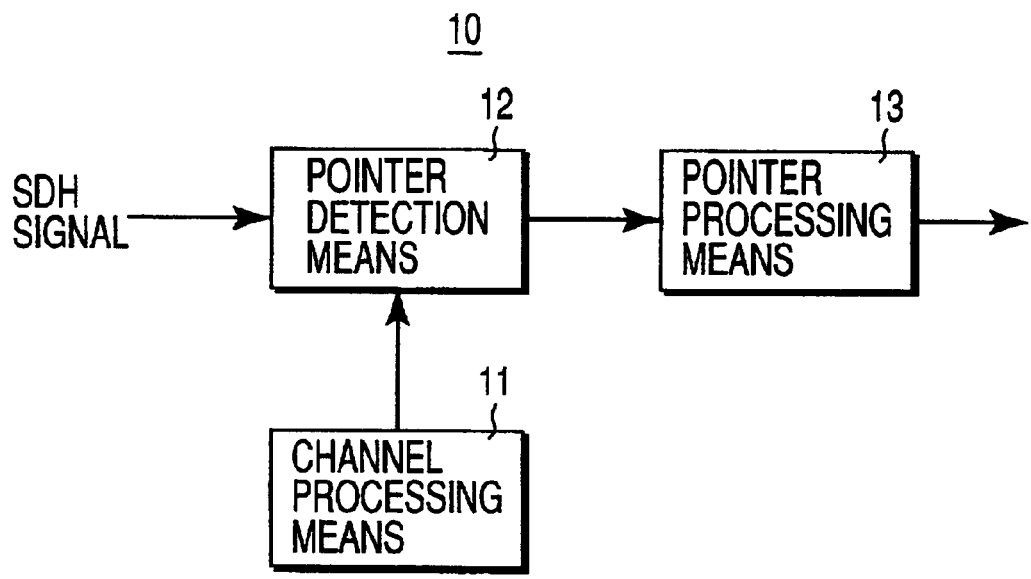
FIG. 5 is a block diagram showing a configuration of a SDH signal channel pointer analyzing apparatus of the prior art.

On the other hand, the reference data readout means 33, as shown in FIG. 3D, reads out the reference data D (1)' of the address AD (1) corresponding to the channel 1 specified by the channel identification information CH (1) output from the channel information detection means 31 among reference data stored the reference data memory 34 and outputs to the pointer processing means 35.

The pointer processing means 35 compares the channel pointer value PTR (1) extracted by the channel pointer extraction means 32 and the channel pointer value PTR (1)' of the previous frame contained in the reference data D (1)' and judges the justification and NDF (new data flag), a kind of pointer change, changing directly into a certain value different from the justification.

Then, if justification, it creates a pointer counter value J (1) increased/decreased by one to the pointer counter data J (1)', and in case of NDF, creates a new pointer counter data J (1).

Besides, in the normal state which is not alarm state, it is judged if the channel pointer value PTR (1) extracted by the channel pointer extraction means 32 is an abnormal pointer or not.

In case of normal pointer, data of fixed value R (for instance, R=5) is generated as alarm detection state data AL (1).

In case of abnormal pointer, data decreased by one from the alarm detection state data AL (1)' contained in the reference data D (1)' is generated as alarm detection state data AL (1).

In addition, in the alarm state, contrary to the normal state, it is judged if the channel pointer value PTR (1) extracted by the channel pointer extraction means 32 is a normal pointer or not.

In case of abnormal pointer, data of fixed value R (for instance, R=5) is generated as alarm detection cancellation state data AL (1).

In case of normal pointer, data decreased by one from the alarm detection cancellation state data AL (1)' contained in the reference data D (1)' is generated as alarm detection cancellation state data AL (1).

Note that, in this case, the alarm detection cancellation condition can be set to a different value respectively.

Then, the reference data D (1)' stored in the address AD (1) of the reference data memory 34 is updated by the reference data update means 36 with a set of reference data (D1) made of channel 1 pointer counter data J (1) and alarm state data AL (1) newly generated by this pointer processing means 35, and extracted channel pointer value PTR (1).

Following this, pointer position information P (2) of channel 2 (this channel 2, detected after the processing for the channel 1 has elapsed, is not continuous to the channel 1) and channel identification information CH (2) specifying this channel 2 are output.

Thereupon, as mentioned above, channel pointer PTR (2) is extracted from this channel 2 pointer position information P (2) and, at the same time, the reference data D (2)' stored in the address AD (2) of the reference data memory 34 is read out and output to the pointer processing means 35.

Similarly as before, the pointer processing means 35 compares the channel pointer value PTR (2) extracted by the channel pointer extraction means 32 and the channel pointer value PTR (2)' contained in the reference data D (2)' and judges the justification and NDF.

Then, if justification, the pointer processing means 35 creates a pointer counter value J (2) increased/decreased by one to the pointer counter data J (2)', and in case of NDF, creates a new pointer counter data J (2).

Besides, in the normal state, it is judged if the extracted channel pointer value PTR (2) is an abnormal pointer or not.

In case of normal pointer, data of fixed value R is generated as alarm detection state data AL (2).

In case of abnormal pointer, data decreased by one from the alarm detection state data AL (2)' contained in the reference data D (2)' is generated as alarm detection state data AL (2).

In addition, in the alarm state, it is judged if the channel pointer value PTR (2) is a normal pointer or not.

In case of abnormal pointer, data of fixed value R is generated as alarm detection cancellation state data AL (2).

In case of normal pointer, data decreased by one from the alarm detection cancellation state data AL (2)' contained in the reference data D (2)' is generated as alarm detection cancellation state data AL (2).

Then, the reference data D (2)' stored in the address AD (2) of the reference data memory 34 is updated by the reference data update means 36 with a set of reference data (D2) made of channel 2 pointer counter data J (2) and alarm state data AL (2) newly generated by this pointer processing means 35, and extracted channel pointer value PTR (2).

Thereafter, similar operation is repeated for K channels, analysis processing for pointer of a plurality of K channels inserted in a single frame of SDH signal is performed, before performing similarly the analysis processing for channel pointer of the next frame.

When the value of newly generated alarm detection state data AL (m) becomes, namely, when R (=5) frames of extracted channel pointer value is judged as abnormal pointer successively, the pointer processing means 35 outputs an alarm signal to inform of the anomaly of this channel.

On the other hand, it cancels the alarm when the detection cancellation state data becomes 0 (cancellation of abnormality message).

Thus, information analyzed for channel pointer of a plurality of channels inserted into a single frames is output to the VC analysis section 25 and used for its information analysis.

The results of analysis by respective analysis section 22, 24, 25, 30 is displayed respectively by the display section 26.

Thus, the channel pointer analysis section 30 of this embodiment comprises channel information detection means 31 for sequentially detecting pointer position information of channels inserted in the frame of the input SDH signal, and channel identification information for identifying the channel, as a set of channel information, channel pointer extraction means 32 for extracting channel pointer value inserted in the SDH signal based on the pointer position information contained in the channel information, each time the channel information is detected by the channel information detection means, a reference data memory 34 for storing channel pointer value, pointer counter data and status data sowing the alarm state as a set of reference data for each channel, respectively in different address area for each channel, reference data readout means 33 for reading out from the reference data memory the reference data of the channel specified by the channel identification information contained in the channel information, each time the channel information is detected by the channel information detection means, pointer processing means 35 for judging the state of justification and alarm, from the channel pointer value extracted from the channel pointer extraction means, and reference data read out by the reference data readout means 33 and for generating a new reference data based on the judgment results, and reference data update means 36 for updating the reference data of the same channel stored in the reference data memory by the new reference data generated by the pointer processing means.

As described above, the SDH signal channel pointer analyzing apparatus of the present invention comprises channel information detection means for sequentially detecting pointer position information of channels inserted in the frame of the input SDH signal, and channel identification information for identifying the channel, as a set of channel information, channel pointer extraction means for extracting channel pointer value inserted in the SDH signal based on the pointer position information contained in the channel information, each time the channel information is detected by the channel information detection means, a reference data memory for storing channel pointer value, pointer counter data and status data sowing the alarm state as a set of reference data for each channel, respectively in different address area for each channel, reference data readout means for reading out from the reference data memory the reference data of the channel specified by the channel identification information contained in the channel information, each time the channel information is detected by the channel information detection means, pointer processing means for judging the state of justification and alarm, from the channel pointer value extracted from the channel pointer extraction means, and reference data read out by the reference data readout means and for generating a new reference data based on the judgment results, and reference data update means for updating the reference data of the same channel stored in the reference data memory by the new reference data generated by the pointer processing means.

Therefore, the present invention allows to supply a SDH signal channel pointer analyzing apparatus that perform the pointer analysis of a plurality of channels inserted into the frame of SDH signal by a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A SDH signal channel pointer analyzing apparatus comprising:

channel information detection means for sequentially detecting pointer position information of channels inserted in a frame of an input SDH signal, and channel identification information for identifying the channel, as a set of channel information;

channel pointer extraction means for extracting channel pointer value inserted in said input SDH signal based on the pointer position information contained in said channel information, each time the channel information is detected by said channel information detection means;

a reference data memory for storing channel pointer value, pointer counter data and status data representing alarm states as a set of reference data for each channel, respectively in different address area for each channel;

reference data readout means for reading out the reference data of the channel specified by channel identification information contained in the channel information from said reference data memory, each time the channel information is detected by said channel information detection means;

pointer processing means for judging states of justification and alarm, from the channel pointer value extracted from said channel pointer extraction means, and reference data read out by said reference data readout means and for generating a new reference data based on the judgment results; and reference data update means for updating the reference data of the same channel stored in said reference data memory by the new reference data generated by said pointer processing means.

2. A SDH signal channel pointer analyzing apparatus according to claim 1, further comprising:

a display means for displaying the results of judgment by said pointer processing means.

3. A SDH signal channel pointer analyzing method comprising the steps of:

sequentially detecting pointer position information of channels inserted in a frame of an input SDH signal, and channel identification information for identifying the channel, as a set of channel information;

extracting channel pointer value inserted in said input SDH signal based on the pointer position information contained in said channel information, each time the channel information is detected;

storing channel pointer value, pointer counter data and status data representing alarm states as a set of reference data for each channel into a reference data memory, respectively in different address area for each channel;

reading out the reference data of the channel specified by channel identification information contained in the channel information from said reference data memory, each time the channel information is detected;

judging states of justification and alarm, from the extracted channel pointer value, and reference data read out from said reference data memory and, generating a new reference data based on the judgment results; and updating the reference data of the same channel stored in said reference data memory by the new reference data.

4. A SDH signal channel pointer analyzing method according to claim 3, further comprising the step of displaying said judgment results.

* * * * *